United States Patent [19]

Sahm

[11] 3,813,132
[45] May 28, 1974

[54] DOVETAIL GUIDE
[75] Inventor: Bernd Sahm, Nauborn, Germany
[73] Assignee: Firma Wilhelm Will KC, Naubonn, Germany
[22] Filed: Dec. 8, 1971
[21] Appl. No.: 205,885

[30] Foreign Application Priority Data
May 15, 1971 Germany............................. 2124228

[52] U.S. Cl............................ 308/3 A, 312/341 NR
[51] Int. Cl. .............................................. F16c 29/00
[58] Field of Search........ 308/DIG. 7, 3 A, 3 R, 3.6; 312/347, 341 NR, 345, 346

[56] References Cited
UNITED STATES PATENTS

| | | | |
|---|---|---|---|
| 2,653,852 | 9/1953 | Bissman | 312/341 NR |
| 2,726,916 | 12/1955 | Regenhardt | 312/341 NR |
| 2,872,184 | 2/1959 | Wise | 308/DIG. 7 |
| 3,054,645 | 9/1962 | Evans | 308/3 A |
| 3,059,986 | 10/1962 | Miller | 308/316 |
| 3,498,685 | 3/1970 | Poplinski | 308/3 R |

FOREIGN PATENTS OR APPLICATIONS
983,250  2/1965  Great Britain....................... 312/346

OTHER PUBLICATIONS
Kenneth G. Harms, "Sintered Nylon Plastics," Product Engineering, Nov. 1954.

*Primary Examiner*—Manuel A. Antonakas
*Assistant Examiner*—R. H. Lazarus
*Attorney, Agent, or Firm*—Edmund M. Jaskiewicz

[57] ABSTRACT

A metallic dovetail guide slideably receives a slide member made of a synthetic plastic material. The slide member is connected by a screw to an outer member so as to define an air gap therebetween and the slide member is sufficiently resilient to exhibit a pretensioning effect on the guide surfaces of the dovetail guide.

3 Claims, 1 Drawing Figure

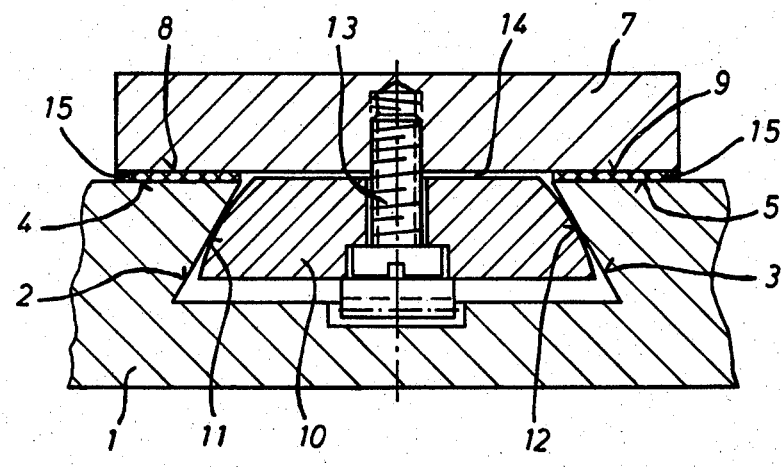

DOVETAIL GUIDE

The present invention relates to a dovetail guide, more particularly, to the construction of such a dovetail guide and a slide member slideably received therein.

Dovetail guides have been used for the precision guiding of one member mounted in slideable relationship on another member. Such guides have been used in many forms of optical devices and instruments to permit very precise displacement of one part of the instrument with respect to another part, such as the adjustment of a microscope stage or tube or the like with respect to a base. In order to obtain such precise sliding adjustment it has been necessary to adjust the guide surfaces of the dovetail guide in very precise and accurate relationship to each other and to the slide member. These guide surfaces were either ground in, lapped in or fitted in by a very precise scraping or shaving to remove metal. Since these processes are lengthy and time consuming and required a high degree of skill on the part of the fabricating personnel accurate and precise dovetail guides have been relatively expensive.

Different forms of guide elements made of synthetic resin or plastic materials have been known but, as far as is known, synthetic plastic materials have not been used in a dovetail guide as disclosed in the present invention. The German Utility Pat. No. 2,989,240 discloses a machine supporting column which is supported and guided on synthetic resin surfaces. However, in this guide the synthetic resin plates are displaced for the purpose of adjustment and readjustment which is not the object of the present invention.

It is therefore the principal object of the present invention to provide a novel and improved dovetail guide which has the same degree of precision as known guides but is substantially less expensive to manufacture.

It is another object of the present invention to provide a dovetail guide having a slide member therein which is attached to an outer member and is capable of precise slideable adjustment in the guide.

According to one aspect of the present invention there may be provided metallic means defining a dovetail guide. A slide member is adapted for sliding movement in the guide and is made of a synthetic plastic material. If stability under high temperature conditions is required the slide member may be made of sintered metal instead of a synthetic plastic material. The use of a slide part as disclosed in the present invention eliminates the necessity for any micro-finishing operation of the cooperating guide surfaces between the slide member and the dovetail guide. Because of the resilient properties of the synthetic plastic material, the slide member will slide over small surface irregularities in the guide surfaces of the dovetail guide without any adverse effect upon accurate positioning of the slide within the dovetail guide.

Other objects and advantages of the present invention will be apparent upon reference to the accompanying description when taken in conjunction with the following drawing, which is exemplary, wherein there is illustrated a transverse sectional view through a dovetail guide and slide member according to the present invention.

As may be seen in the drawing, a metal base 1 is provided with two inclined inner guide surfaces 2 and 3 which may be the walls of a guide slot, as shown, and also with two outer guide surfaces 4 and 5 to define a dovetail guide. The inner and outer guide surfaces may also be formed on the faces of guide elements attached to a metallic base with the guide elements essentially defining guide rails.

A slide member 10 has a cross section configuration substantially conforming to the configuration of the dovetail guide and is provided with inclined slide surfaces 11 and 12 which slideably engage the guide surfaces 2 and 3 respectively. The surfaces 11 and 12 are curved or slightly spherical as shown in the drawing and may have a radius of curvature of about 500–1,000 mm. The slide member 10 is made of a synthetic resin or plastic material having high strength and good sliding properties. Such plastics would include, but not be limited to, polyamides supplemented by molybdenum disulfite. An outer member 7 is attached to the slide member 10 by a screw 13 in such a manner that a space of air gap 14 is provided between the parts 7 and 10. The air gap is small, of the order of 0 mm, but would not exceed 0.1 mm. The outer part 7 is made of metal and is provided with guide surfaces 8 and 9 that slide on the surfaces 4 and 5 respectively. There is a film of lubricant 15 between the surfaces 4, 8 and 5, 9.

Upon tightening of the fastening screw 13 the slide member 10 will be bent slightly in the plane of the drawing so that a pretensioning effect is obtained. This pretensioning determines the ease or difficulty with which the moveable parts, i.e., slide 10 and outer member 7, can be displaced with respect to the body 1. Further, this pretensioning provides that the friction between guide surfaces 4, 5 and surface 8, 9 as well as between surfaces 2, 3 and surfaces 11, 12 remains uniform even after extensive use so that any wear in the guide surfaces is not noticeable. Thus, inaccurate guiding of a member within the dovetail guide because of wear of the guide surfaces is avoided. With guide surfaces known at the present time it is necessary that the guide surfaces be reworked from time to time in order to insure accuracy.

Since the pretensioning effect is exerted primarily on the inner guide surfaces, the guide surfaces 11 and 12 on the synthetic plastic slide member 10 are curved or slightly spherical so that any tilting of these guide surfaces because of bending of the slide member 10 will not be noticeable and will not affect sliding movement of the member 10 in the dovetail guide.

If high temperature stability is required of the dovetail guide and slide the slide member 10 may be made of sintered metal. The sintered metal may comprise any metal which can be crushed or pulverized and the particles bonded together under pressure. The bronzes would be particularly suitable for such an application.

Similar to guides and slides made entirely of metal a film of a suitable lubricant is between the guide surfaces.

Thus it can be seen that the present invention has disclosed a dovetail guide which provides the high degree of accuracy which may be required in various scientific and industrial instruments but which is considerably less expensive in manufacture and maintenance.

A further advantage of the present invention is that it is not necessary to make the surface finish on the guide surfaces as smooth as was previously required. Previously, the guide surfaces would have to have a surface finish so smooth that the average distance between depressions and rises in the finished surface could not be measured. The processing necessary to obtain such a surface finish is actually not the basic problem but the problem is that the gripping of the guide surfaces during the machining operation always produces a deflection or bending in these guide surfaces. When the gripping apparatus is released and the guide surfaces are to be installed, they are generally deformed or defected by an amount which might range from 0.01 to 0.1 mm. The amount of deformation would depend upon the length of the guide and the decree of accuracy of the machining operation. According to the present invention it is not necessary to place such great emphasis on precision in machining the guide surfaces and on surface depressions or bumps.

It is understood that this invention is susceptible to modification in order to adapt it to different usages and conditions and, accordingly, it is desired to comprehend such modifications within the invention as may fall within the scope of the appended claims.

What is claimed is:

1. In a precision slide guide, the combination of metallic means defining a dovetail guide of predetermined depth, a slide member adapted for sliding movement in said guide and made of a synthetic plastic material, said dovetail guide having inclined guide surfaces, said slide member being of a depth of less than the depth of the guide and said slide member being resilient so as to exhibit a pretensioning effect on the guide surfaces of said guide, an outer member outside of said guide and connected to said slide member to define an air gap therebetween, and a screw connecting said outer member to said slide member, said pretensioning being effected by bending of said slide member upon tightening of said screw to move said slide towards said outer member.

2. In the combination of claim 1 wherein said slide member has inclined guide surfaces for cooperation with the guide surfaces of said dovetail guide, said slide member guide surfaces being slightly spherical.

3. In the combination of claim 1 wherein the slide member is made of sintered metal instead of synthetic plastic material.

* * * * *